United States Patent
Bratek et al.

(10) Patent No.: US 10,239,004 B2
(45) Date of Patent: Mar. 26, 2019

(54) OIL SEPARATOR FOR REDUCING RESIDUE DEPOSITS

(71) Applicant: Continental Automotive Systems, Inc., Auburn Hills, MI (US)

(72) Inventors: Daniel J. Bratek, Arlington Heights, IL (US); Jen-Huang Albert Chiou, Libertyville, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 215 days.

(21) Appl. No.: 15/583,676

(22) Filed: May 1, 2017

(65) Prior Publication Data
US 2017/0326487 A1 Nov. 16, 2017

Related U.S. Application Data

(60) Provisional application No. 62/334,062, filed on May 10, 2016.

(51) Int. Cl.
*G01L 9/00* (2006.01)
*G01L 19/06* (2006.01)
(Continued)

(52) U.S. Cl.
CPC ............ *B01D 45/08* (2013.01); *G01L 9/0052* (2013.01); *G01L 9/0055* (2013.01);
(Continued)

(58) Field of Classification Search
CPC ........ B01D 45/06; B01D 45/08; F01M 11/10; F01M 13/04; F01M 2013/0438;
(Continued)

(56) References Cited

U.S. PATENT DOCUMENTS 2,732,033 A * 1/1956 Parks ..................... B01D 45/08
55/391
3,304,697 A 2/1967 Ramsey
(Continued)

FOREIGN PATENT DOCUMENTS

DE 202007015623 U1 3/2008
DE 102008002561 A1 8/2009
(Continued)

OTHER PUBLICATIONS

International Search Report and Written Opinion dated Sep. 5, 2017 from corresponding International Patent Application No. PCT/US2017/030428.
(Continued)

*Primary Examiner* — Frank M Lawrence, Jr.

(57) ABSTRACT

A pressure sensor includes a pressure sensing element in fluid communication with a port and an oil separator in the port. The oil separator is configured to reduce an amount of oil-vapor residue that reaches the pressure sensing element by elongating a path of fluid from an opening of the port to the pressure sensing element and by creating additional surface area within the port upon which oil-vapor residue may be deposited. There is also a cover, which has holes, and that is configured to prevent the oil separator from falling out of the port. The oil separator may include circular discs having cut-out portions. The cut-out portions on adjacent circular discs may be rotated relative to one another about a longitudinal axis of the oil separator. The cut-out portions may have a semi-circular shape.

16 Claims, 16 Drawing Sheets

(51) Int. Cl.
   *B01D 45/08* (2006.01)
   *G01L 19/00* (2006.01)
   *F01M 11/10* (2006.01)
   *F01M 13/04* (2006.01)

(52) U.S. Cl.
   CPC ...... *G01L 19/0007* (2013.01); *G01L 19/0654* (2013.01); *F01M 11/10* (2013.01); *F01M 13/04* (2013.01); *F01M 2013/0438* (2013.01)

(58) Field of Classification Search
   CPC ............. G01L 19/0007; G01L 19/0654; G01L 19/0627; G01L 9/0052; G01L 9/0055
   USPC .................. 95/272; 55/385.3, 442–446, 490, 55/DIG. 19
   See application file for complete search history.

(56) References Cited

U.S. PATENT DOCUMENTS

| | | | | |
|---|---|---|---|---|
| 3,721,069 | A * | 3/1973 | Walker | F01M 11/08 210/DIG. 5 |
| 5,129,371 | A | 7/1992 | Rosalik, Jr. | |
| 5,591,243 | A * | 1/1997 | Colussi | B01D 45/08 55/321 |
| 7,309,308 | B2 | 12/2007 | Berger et al. | |
| 9,346,033 | B2 * | 5/2016 | Bushkov | B01J 10/00 |
| 2003/0150198 | A1 * | 8/2003 | Illingworth | A47L 5/24 55/406 |
| 2003/0167852 | A1 | 9/2003 | Traverso | |
| 2006/0090568 | A1 | 5/2006 | Silverbrook et al. | |
| 2006/0272626 | A1 * | 12/2006 | Roberts | B01D 19/0042 123/573 |
| 2008/0307890 | A1 | 12/2008 | Wuest | |
| 2009/0126709 | A1 | 5/2009 | Manookian, Jr. | |
| 2009/0166286 | A1 | 7/2009 | Volchko | |
| 2014/0318656 | A1 | 10/2014 | Gu et al. | |
| 2015/0040674 | A1 | 2/2015 | Ishihara et al. | |
| 2016/0186624 | A1 * | 6/2016 | Meusel | F01L 1/047 96/400 |

FOREIGN PATENT DOCUMENTS

| | | |
|---|---|---|
| DE | 202011100428 U1 | 7/2011 |
| DE | 102011109734 A1 | 2/2013 |
| WO | 2006/076745 A1 | 7/2006 |

OTHER PUBLICATIONS

Search Report dated Sep. 29, 2016, from corresponding GB Patent Application No. GB1609449.2.

* cited by examiner

OIL SEPARATOR FOR REDUCING RESIDUE DEPOSITS

BACKGROUND

Embodiments of the invention relate generally to pressure sensors for automotive use.

Residues from crankcase oil vapor can pass through a pressure sensor housing port as shown in FIG. 1A and reach the bottom surface of a pressure sensing element diaphragm as depicted in FIG. 1B and form deposits there.

FIG. 1A is a cross-sectional view of a pressure sensor in accordance with the prior art. The pressure sensor includes a pressure sensing element 100, a cover 102, an application-specific integrated circuit ("ASIC") 106, a port 108, an O-ring 110, and a housing 114.

FIG. 1B is a cross-sectional view of a pressure sensing element 100 in accordance with the prior art. The pressure sensing element 100 including a silicon substrate 116, and a glass pedestal 122 anodically bonded to each other is mounted onto a housing substrate 126 using adhesive 124. The silicon substrate 116 is etched to form a cavity 120 from the bottom side and a diaphragm 118 at the top side.

FIG. 2A is a top view of a pressure sensing element 100. P+ conductive silicon interconnects 200 connect a picture-frame transducer 202 (or micro-Wheatstone bridge) that includes four piezoresistors to Vn 204, Sp 206, Vp 208, and Sn 210.

FIG. 2B shows the four piezoresistors, R1-R4, of the picture-frame transducer 202.

FIG. 3 shows the backside 302 and the edge 304 of the diaphragm 118. Enough accumulation of residue 300 on the backside of the diaphragm, as shown in FIG. 3, can induce stresses on the piezoresistors on the top side of the pressure sensing element thereby undesirably causing a voltage shift, which negatively affects sensing accuracy. As such, improved techniques for preventing accumulation of crankcase oil vapor residue would advance the art.

BRIEF SUMMARY

Embodiments of the invention are directed to a pressure sensor that includes a pressure sensing element in fluid communication with a port and an oil separator in the port. The oil separator is configured to reduce an amount of oil-vapor residue that reaches the backside of the pressure sensing element diaphragm by elongating a path of fluid from an opening of the port to the pressure sensing element and by creating additional surface area within the port upon which oil-vapor residue may be deposited. There is also a cover, which has through holes, and that is configured to prevent the oil separator from falling out of the port. The cover having through holes also functions as a rough filter to reduce oil-vapor residues getting into the port. The cover may also work as a mechanical stopper to prevent the top portion of the oil separator without standoffs from damaging the top portion of the port and the pressure sensing element on the top of the port. The oil separator may include circular discs having cut-out portions. The cut-out portions on adjacent circular discs may be rotated relative to one another about a longitudinal axis of the oil separator. The cut-out portions may have a semi-circular shape.

DETAILED DESCRIPTION

Figure 1A:
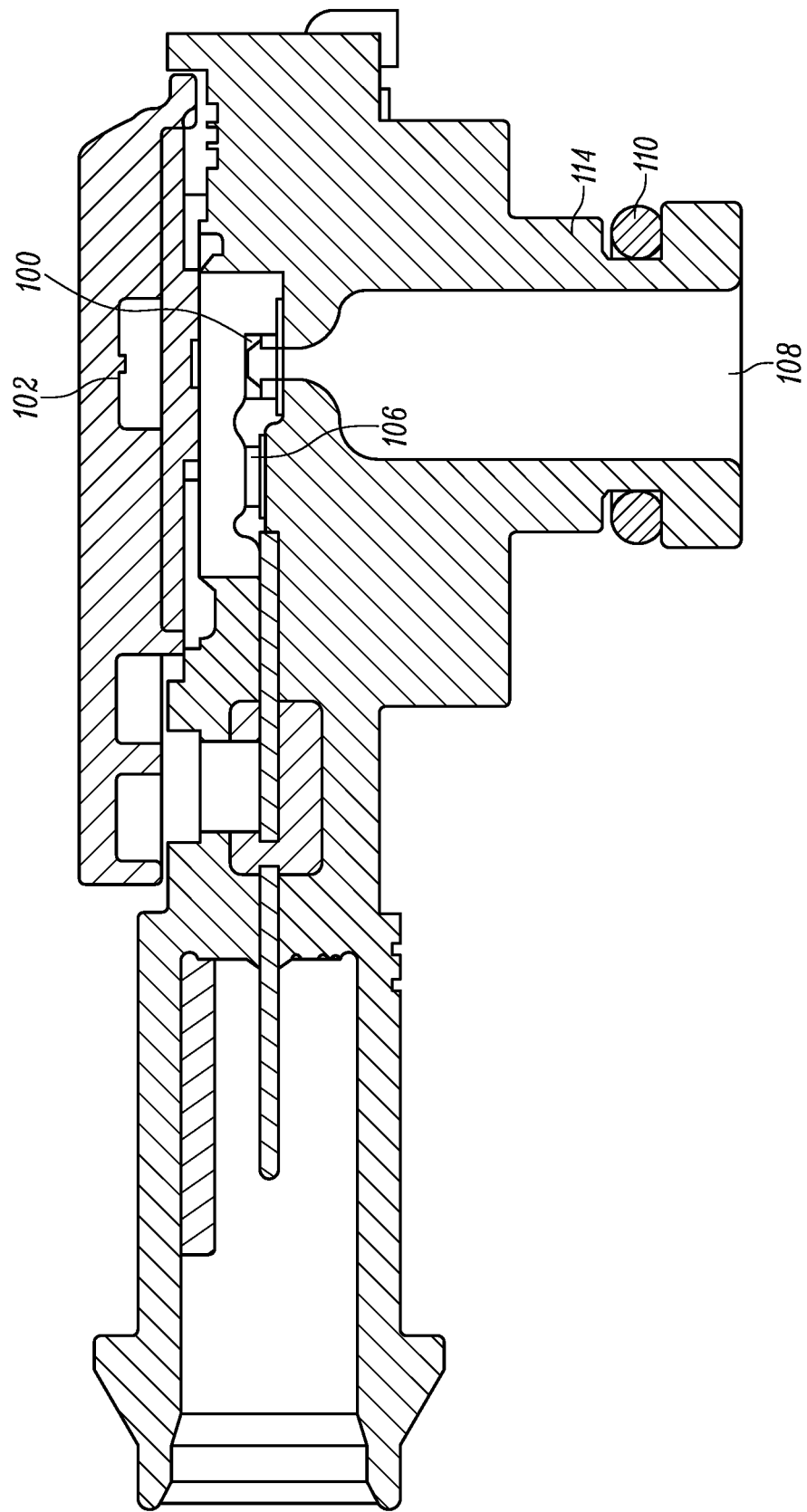
FIG. 1A is a cross-sectional view of a pressure sensor in accordance with the prior art.
Figure 1B:
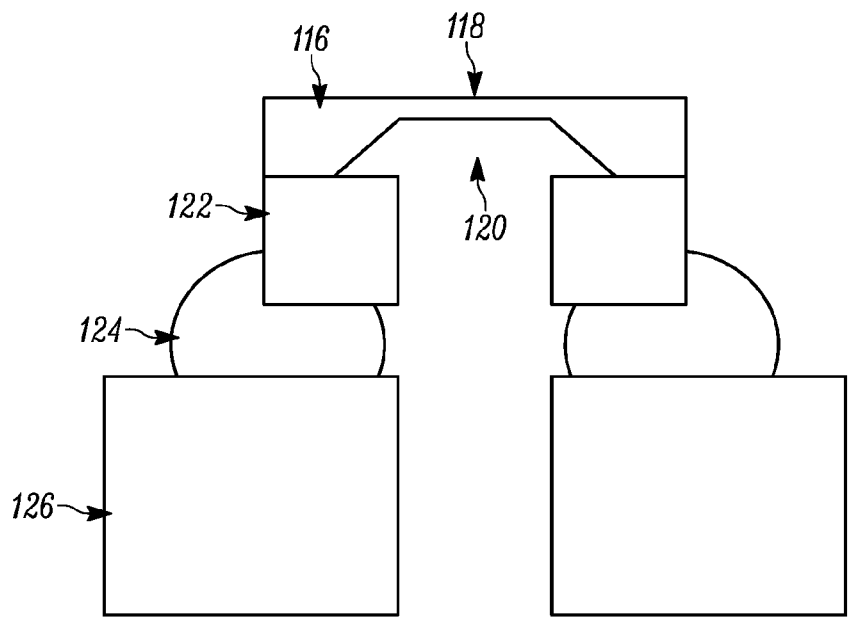
FIG. 1B is a cross-sectional view of a pressure sensing element in accordance with the prior art.
Figure 2A:
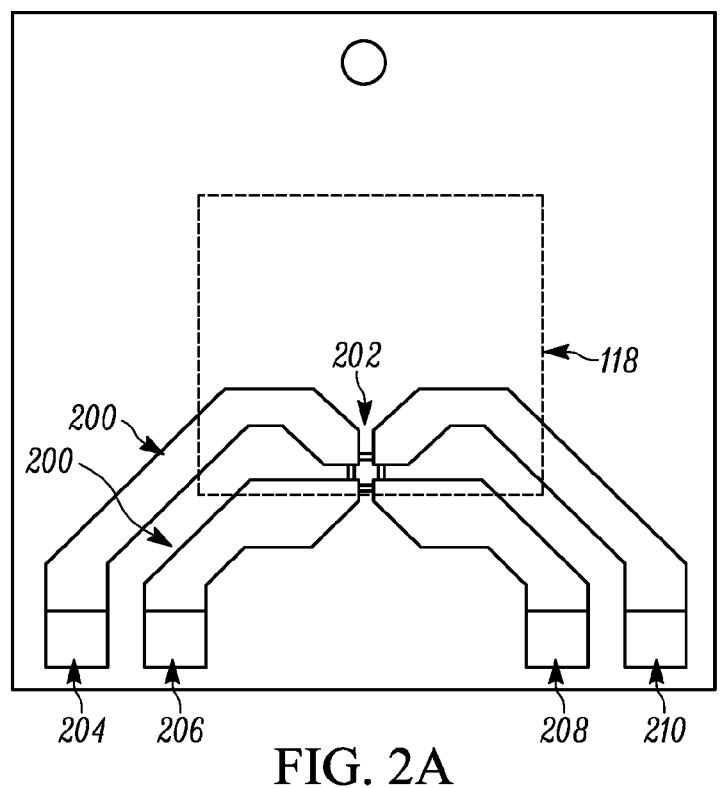
FIG. 2A is a top view of a pressure sensing element.
Figure 2B:
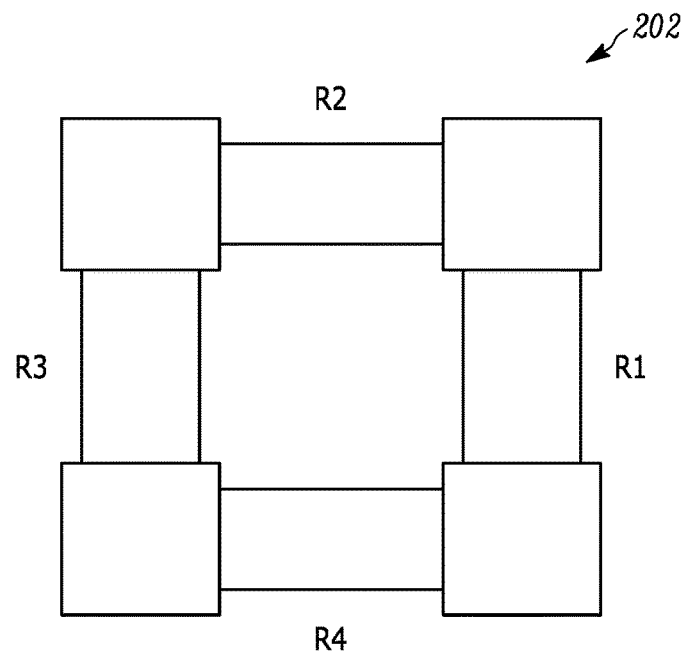
FIG. 2B shows the four piezoresistors, R1-R4, of the picture-frame transducer
Figure 3:
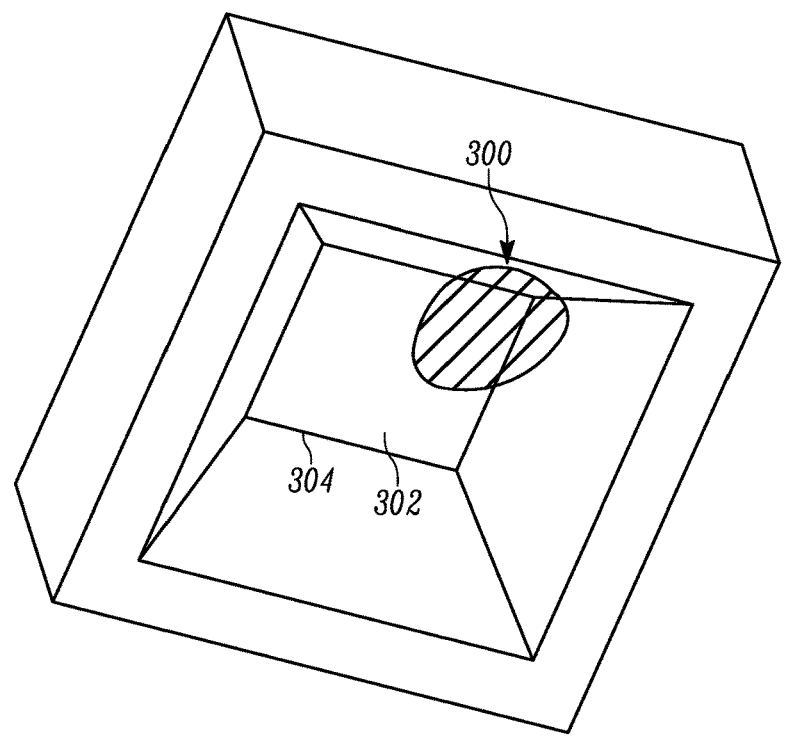
FIG. 3 shows residue deposited on the backside and the edge of the diaphragm.
Figure 4A:
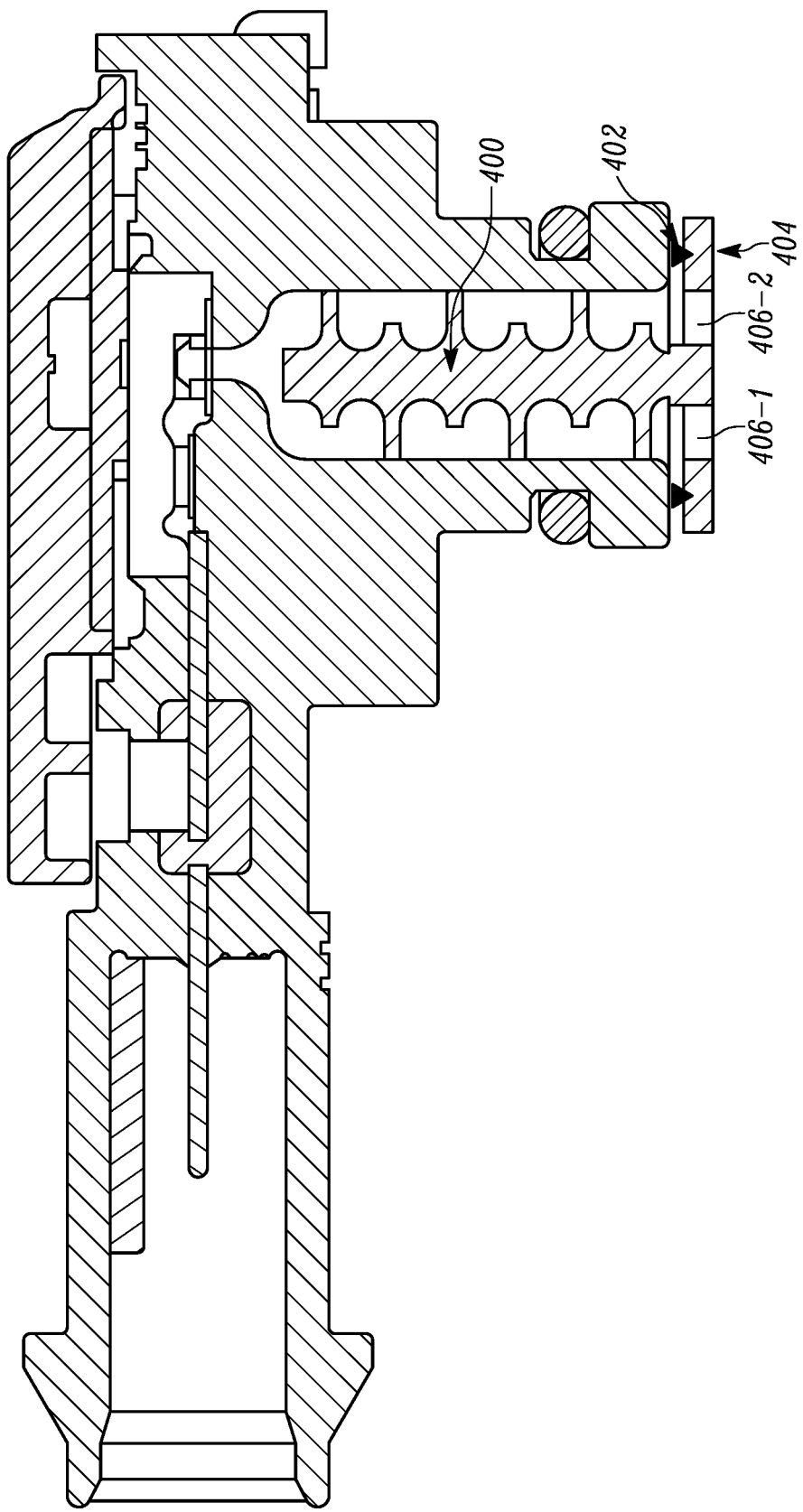
FIG. 4A shows a single-pieced oil separator comprising a cover ultrasonically point-joint-welded to the bottom of the port to prevent the oil separator from falling out of the port in accordance with an embodiment of the invention.
Figure 4B:
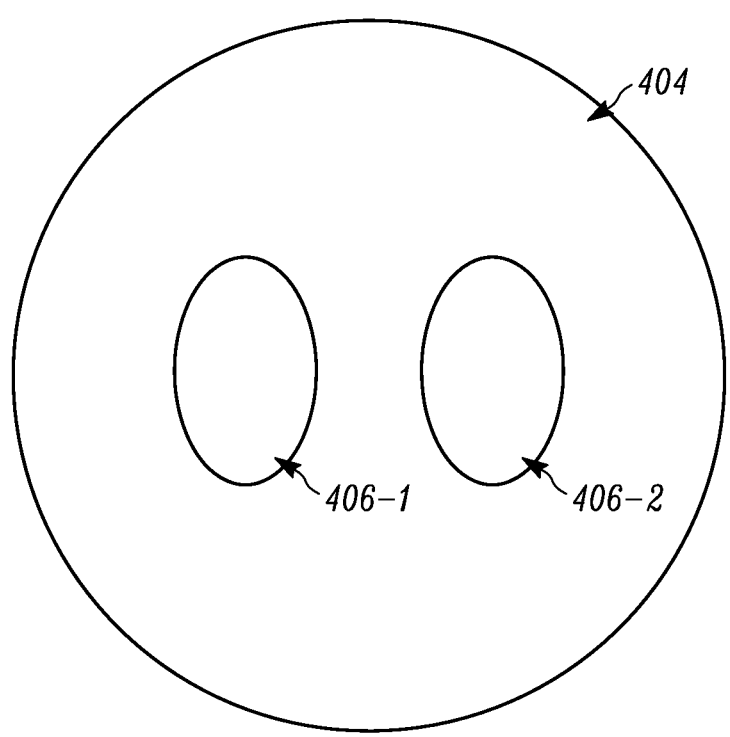
FIG. 4B is a bottom view of the cover showing through holes.
Figure 5:
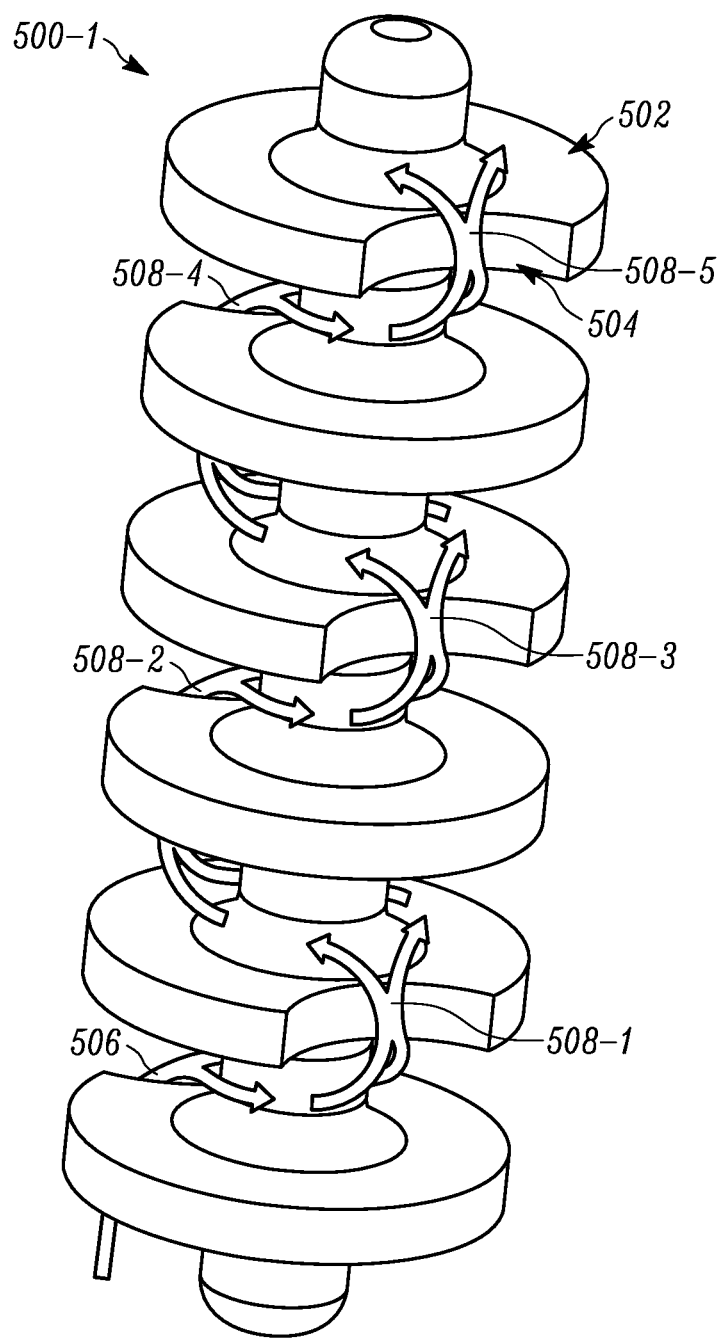
FIG. 5 shows an oil separator in accordance with embodiments of the invention.
Figure 6:
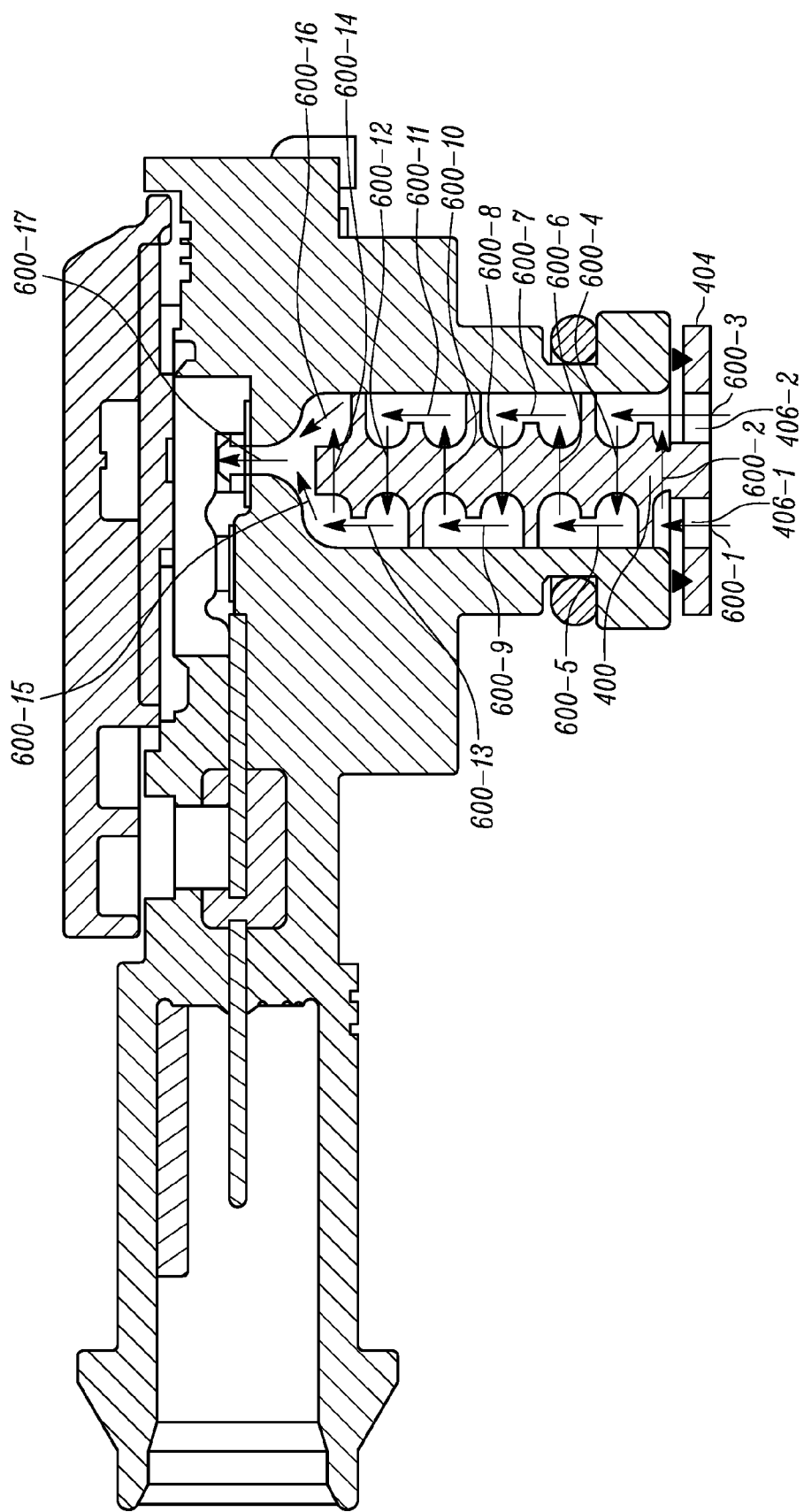
FIG. 6 shows fuel-vapor flow in accordance with embodiments of the invention.

In accordance with embodiments of the invention and with reference to FIGS. 4-6, an oil separator is inserted into a pressure-sensor port to elongate a flow path between the opening of the port and the diaphragm. As shown in FIG. 6, the air flows through each cut-out of a disc, and the cover attached to the oil separator provides a mechanical stop to prevent the oil separator from falling out of the port. The oil separator has discs with cut-outs (or spiral paths) as shown in FIG. 5. The oil separator is installed inside a port of a pressure sensor housing to elongate the air passage thereby allowing more residues to be deposited upon the surfaces of the oil separator. This is mainly due to increases in surface area and passage length, which effectively reduce residue deposition on the backside surface of the pressure sensing element, which in turn, reduces voltage shift and improves sensing accuracy.

FIG. 4A shows a single-pieced oil separator comprising a cover ultrasonically point-joint-welded to the bottom of the port to prevent the oil separator from falling out of the port in accordance with an embodiment of the invention. The oil separator 400 and cover 404 are formed as a single piece by, for example, injection molding or welding. The cover 404 may be ultrasonically welded, as depicted by point joint-ultrasonic weld 402, to the bottom of the pressure-sensor port. The oil separator and cover may be made of the same type of plastic as that of the pressure-sensor housing to facilitate welding the cover and the housing together. For example, Polybutylene terephthalate ("PBT"), Polyphenylene sulfide ("PPS") or any other suitable material may be used. Ultrasonic welding, which is commonly used for plastics, uses high-frequency ultrasonic acoustic vibrations that are locally applied to work pieces being held together under pressure to create a solid-state weld.

FIG. 4B is a bottom view of the cover 404 showing through holes 406-1 and 406-2 to allow the oil-vapor to flow into the port and reach the backside of the pressure sensing element diaphragm 118 for pressure sensing. The cover having through holes also functions as a rough filter to reduce the oil-vapor residue getting into the port. The cover can also work as a mechanical stopper to prevent the top portion of the oil separator from damaging the top portion of the port and the pressure sensing element on the top of the port.

FIG. 5 shows an oil separator 500-1 in accordance with embodiments of the invention. The oil separator has a longitudinal axis and includes discs 502, which are oriented transversely from the longitudinal axis. Each of the discs has a cut-out section 504. As shown in FIG. 5, the cut-out section of a particular disc is rotated 180 degrees relative to discs immediately above and/or below the disc. The cut-out sections shown in FIG. 5 are in the shape of a circular arc. As will be apparent to those of ordinary skill in the art, other suitable shapes and orientations of cut-out sections from one disc to another may also be used.

FIG. 6 shows oil-vapor flow in accordance with embodiments of the invention. In FIG. 6, arrows 600-1 through 600-17 represent oil-vapor flow in accordance with various embodiments. Oil vapor flows through the left-side hole of the cover, as shown by 600-1, then flows from left to right, as shown by 600-2, and joins oil vapor flowing through the right-side hole and up through a cut-out portion of a disc on the right side of the oil separator, as shown by 600-3. Oil vapor then flows from right to left, as shown by 600-4, because the cut-out portion of the next disc up is to the left in FIG. 6. Oil vapor then flows up through a cut-out portion of a disc on the left side of the port, as shown by 600-5. Oil vapor continues to flow in the pattern discussed above for arrows 600-2 through 600-5, as shown by arrows 600-6 through 600-14. And fuel vapor flows up from above the top-most disc to the diaphragm, as shown by 600-15, 600-16, and 600-17. As such, the oil separator causes the oil-vapor flow to follow a tortuous flow path, as depicted in both FIGS. 5 and 6, involving flowing up through a cutout portion of a lower disc and dividing into separate flows that go around the longitudinal axis of the oil separator toward a cutout portion in a higher disc, as shown at 506 in FIG. 5. The separate flows then recombine with each other and flow up through the cutout portion in the higher disc, then divide again, and flow back around the longitudinal axis of the oil separator away from the cutout portion of the higher disc, as shown at 508-1. The tortuous flow path continues in this way as depicted at 508-2 through 508-5. The tortuous oil vapor flow path caused by the flow path separating, recombining, and flowing through the cutout portions of the discs results in more residues being removed from the oil vapor than an amount of residues removed by prior art oil separators that have continuous, non-tortuous oil-vapor flow paths.

Figure 7:
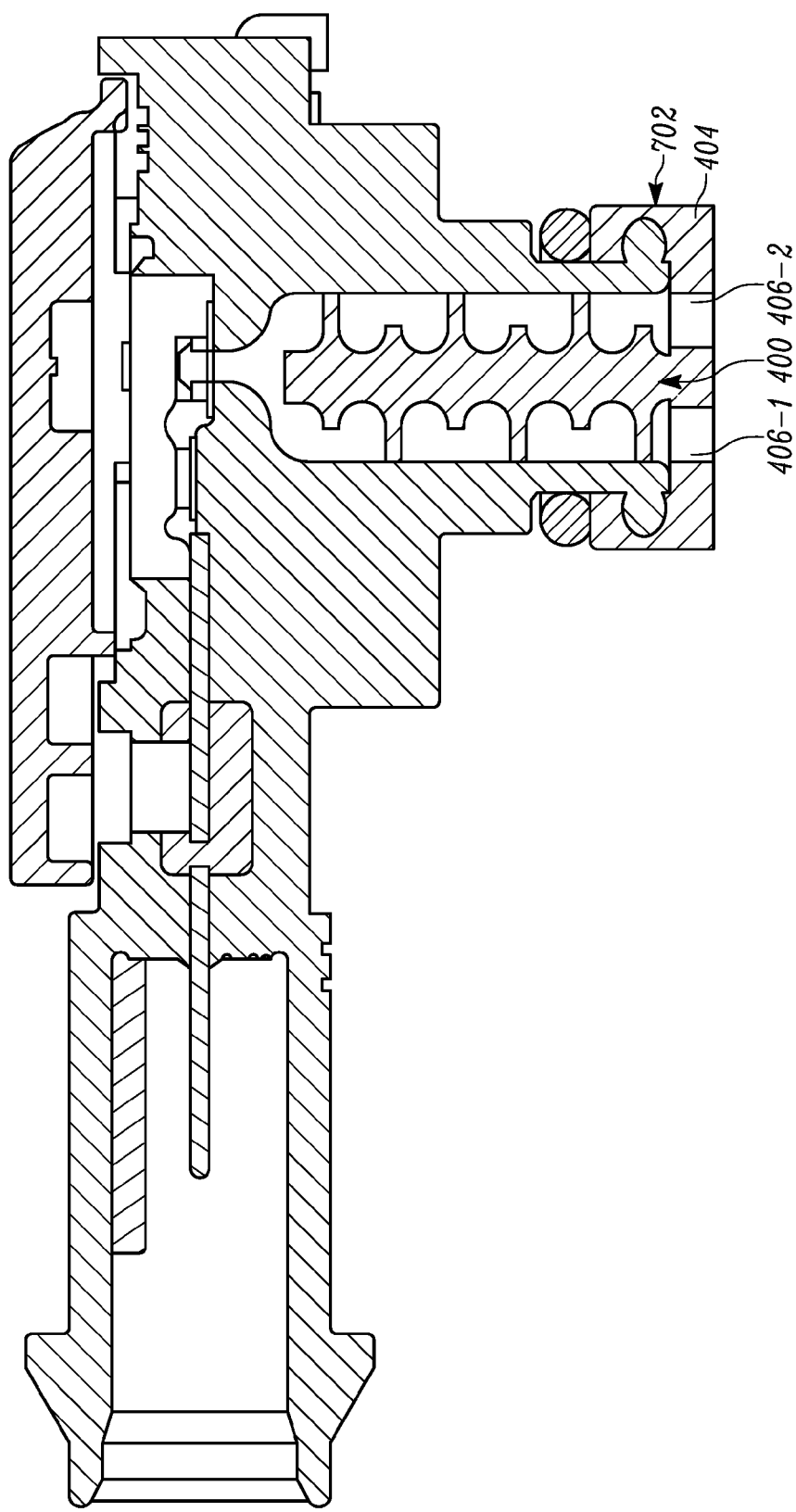
FIG. 7 depicts an embodiment of the invention having a single-pieced oil separator and cover snap-fitted to the bottom of the port.

FIG. 7 depicts an embodiment of the invention having an oil separator 400 welded to a cover 404 to form a single-pieced oil separator and then snap-fitted, as depicted by 702, to the bottom of the port to prevent the oil separator from falling out of the port. The oil separator 400 and cover 404 may also be formed as a single piece by injection molding and then snap-fitted, as depicted by 702, to the bottom of the port.

Figure 8:
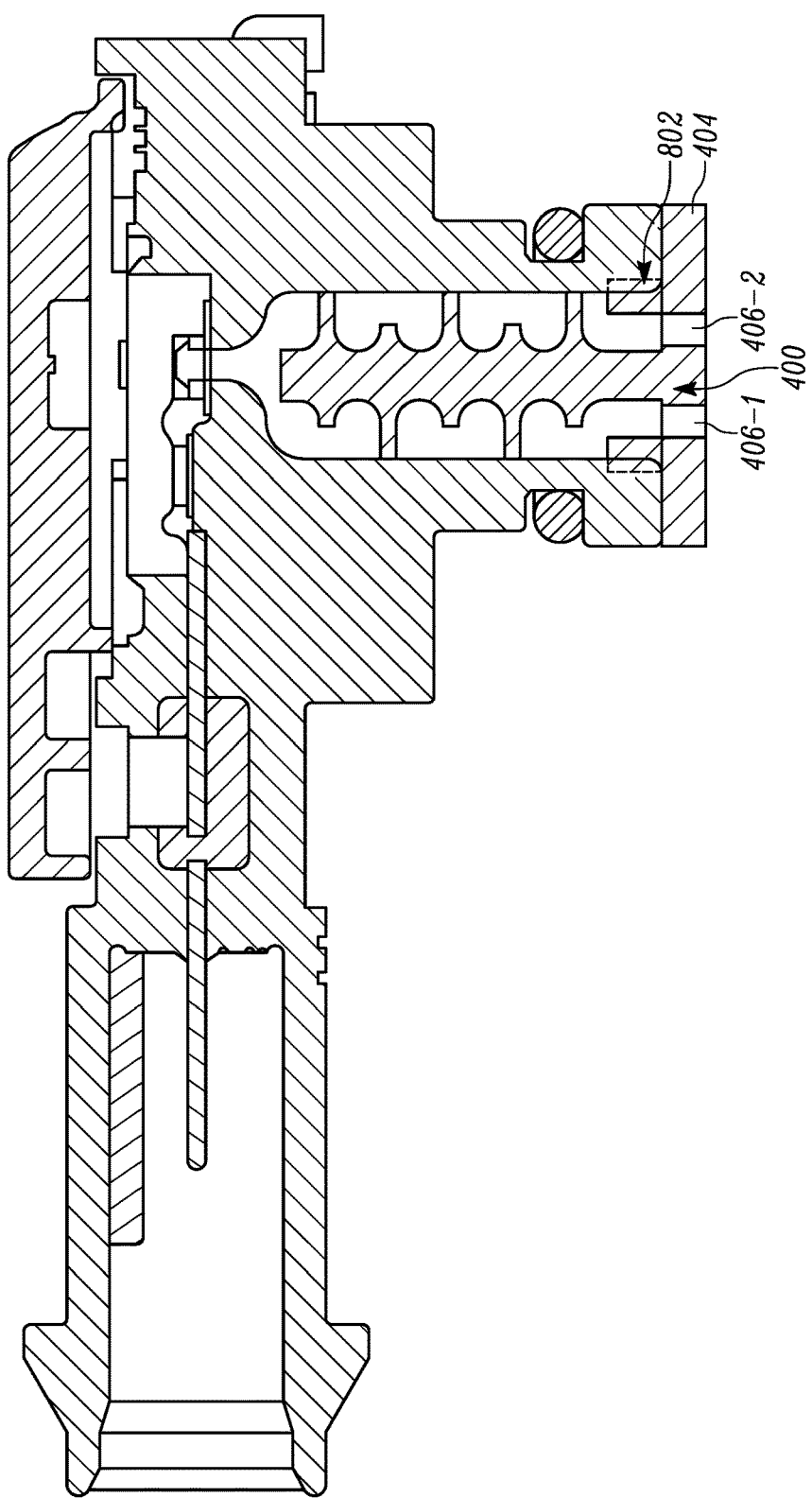
FIG. 8 depicts an embodiment of the invention having a single-pieced oil separator and cover ultrasonically shear-joint-welded to the bottom of the port.

FIG. 8 depicts an embodiment of the invention having an oil separator 400 welded to a cover 404 and then welded, as depicted by 802, to the bottom of the port to prevent the oil separator from falling out of the port. The oil separator 400 and cover 404 may also be formed as a single piece by injection molding and then welded, as depicted by 802, to the bottom of the port.

Figure 9:
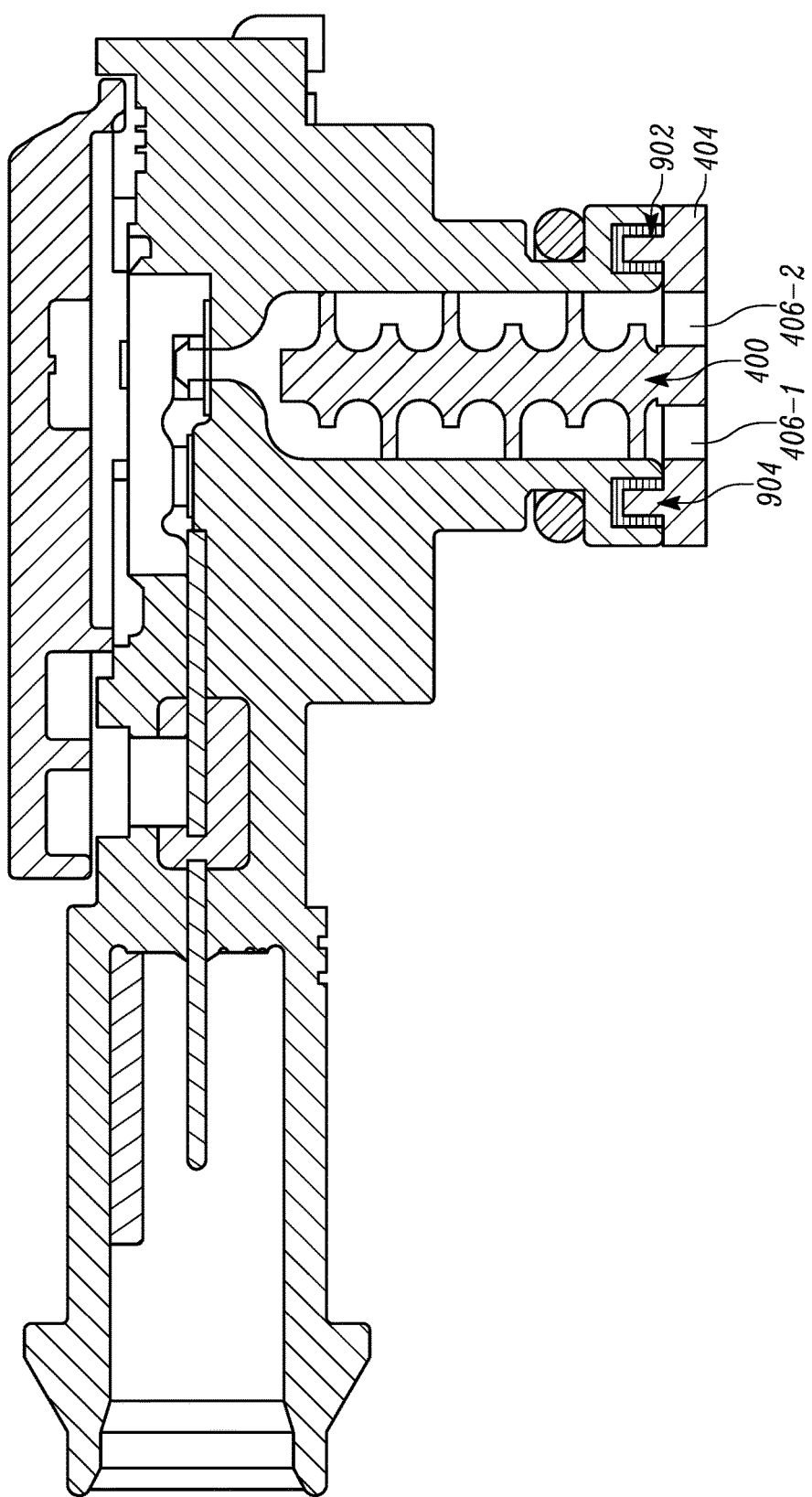
FIG. 9 depicts an embodiment of the invention having a single-pieced oil separator and cover glued to the bottom of the port.

FIG. 9 depicts an embodiment of the invention having an oil separator 400 welded to a cover and then glued, as depicted by adhesive-filled annular groove 902 and annular ridge 904, to the bottom of the port to prevent the oil separator from falling out of the port. The adhesive-filled annular groove and the annular ridge may extend 380 degrees around the opening of the port. The oil separator 400 and cover 404 may also be formed as a single piece by injection, molding and then glued, as depicted by adhesive-filled annular groove 902 and annular ridge 904, to the bottom of the port.

Figure 10:
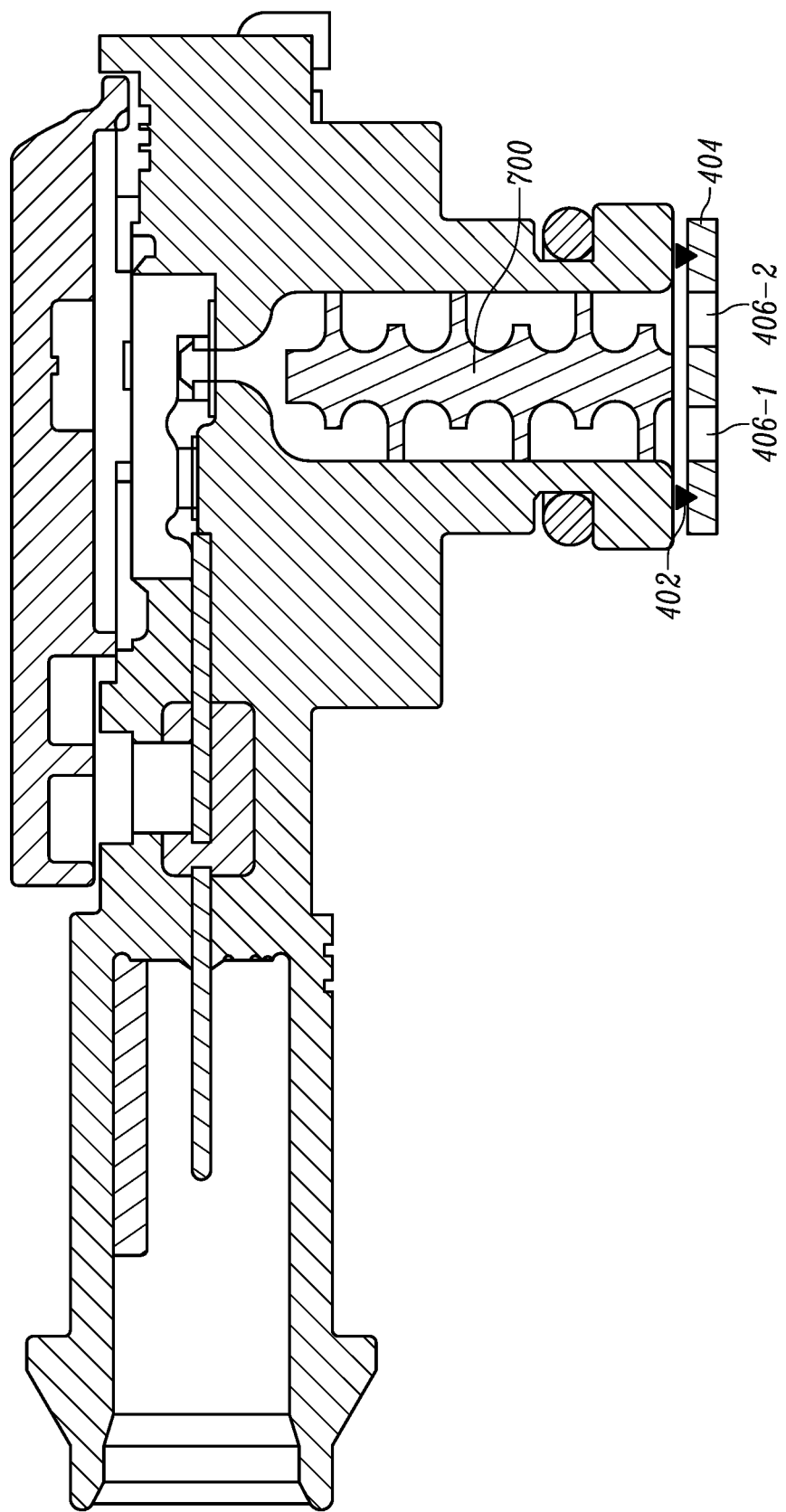
FIG. 10 shows an embodiment similar to FIG. 1A, except that the single-pieced oil separator and cover of FIG. 4A is replaced by a two-pieced oil separator and cover in FIG. 10.

FIG. 10 shows an embodiment similar to FIG. 4A, except that the single-pieced oil separator and cover of FIG. 4A is replaced by a two-pieced oil separator 700 and cover 404 in FIG. 10. The cover is ultrasonically point-joint-welded to the bottom of the port, as depicted by ultrasonic weld 402, to prevent the oil separator from falling out of the port.

Figure 11:
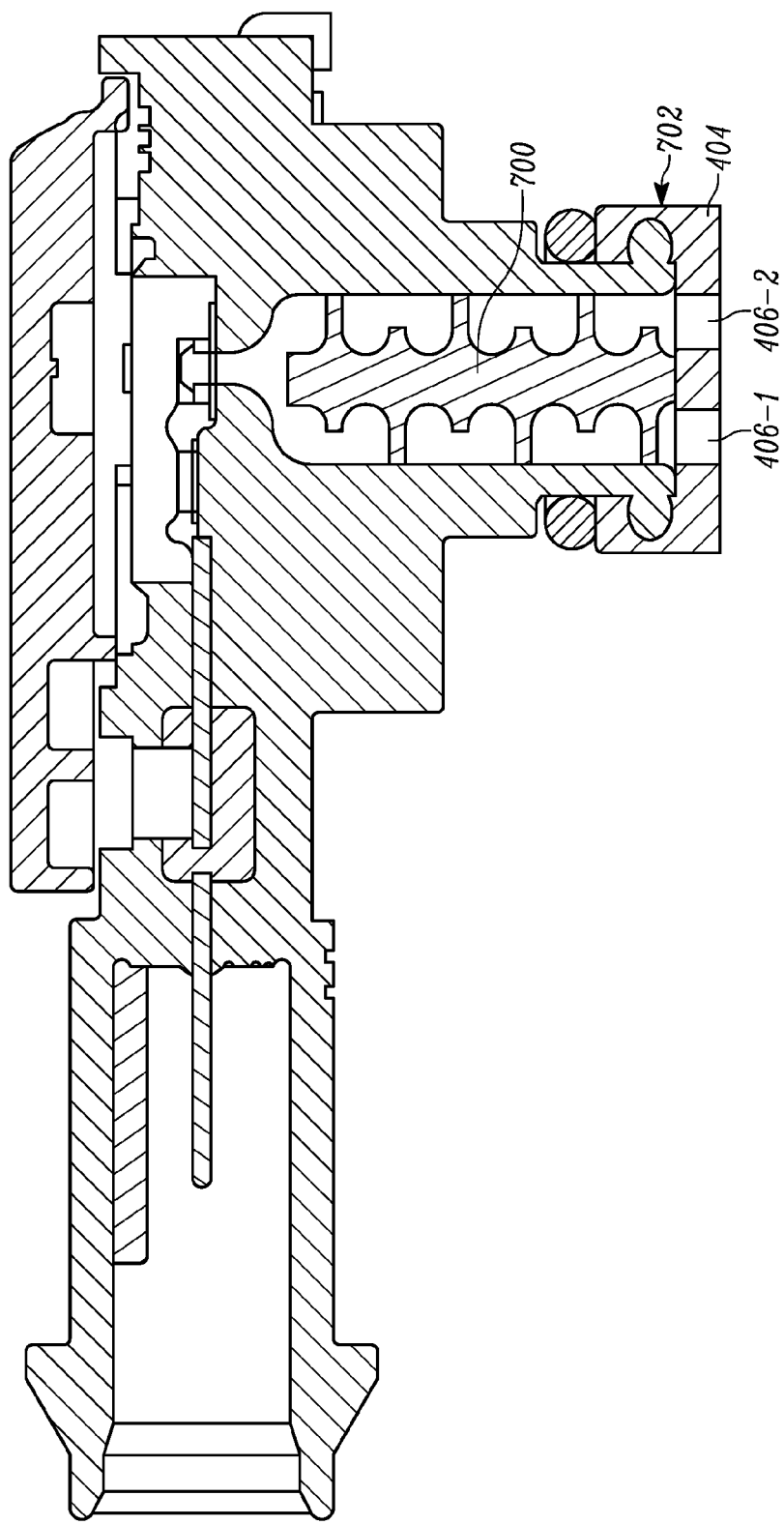
FIG. 11 depicts an embodiment similar to FIG. 7, except that the single-pieced oil separator and cover of FIG. 7 is replaced by a two-pieced oil separator and cover in FIG. 11.

FIG. 11 depicts an embodiment similar to FIG. 7, except that the single-pieced oil separator and cover of FIG. 7 is replaced by a two-pieced oil separator 700 and cover 404 in FIG. 11. The cover is snap-fitted, as depicted by 702, to the bottom of the port to prevent the oil separator from falling out of the port.

Figure 12:
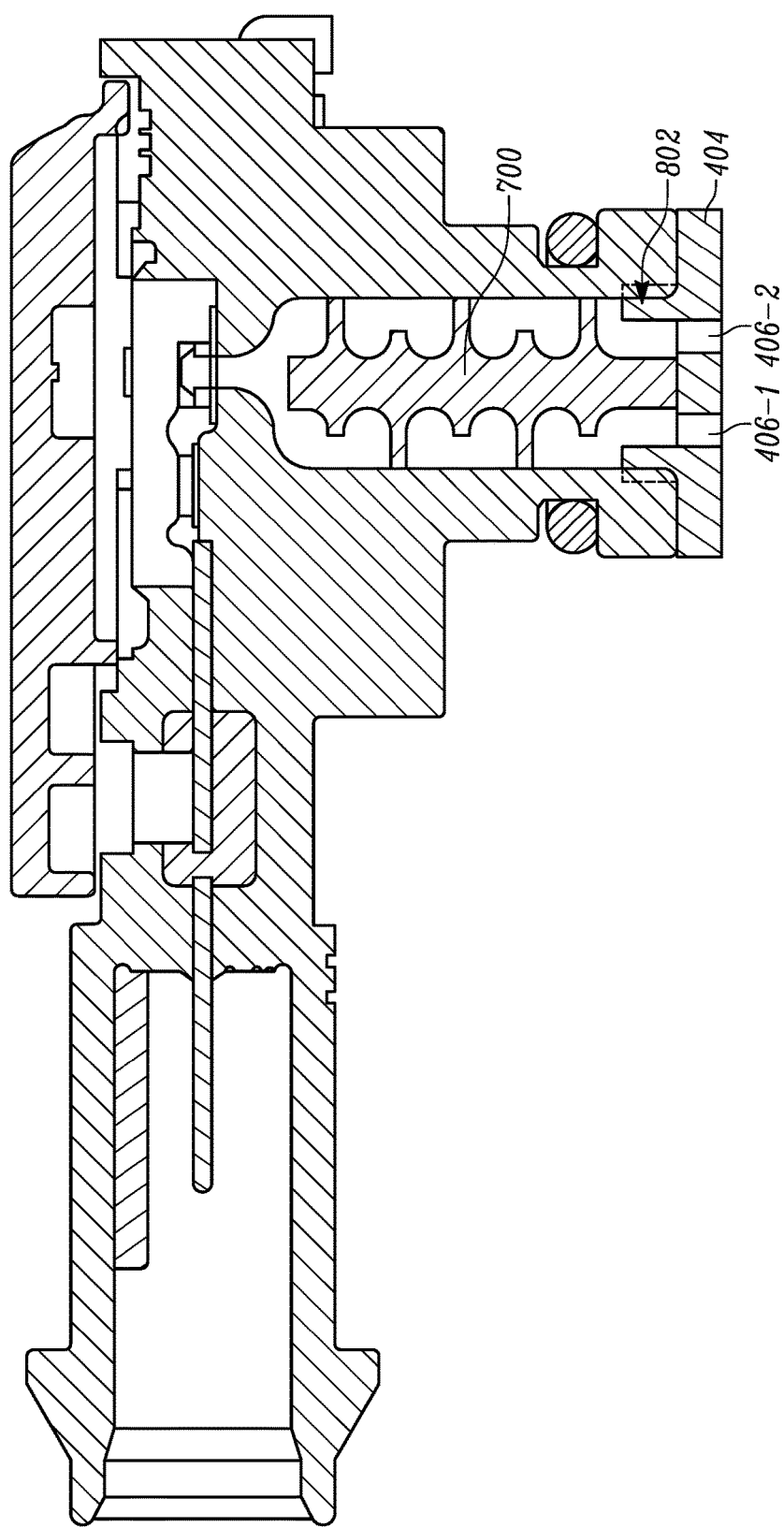
FIG. 12 depicts an embodiment similar to FIG. 8, except that the single-pieced oil separator and cover of FIG. 8 is replaced by a two-pieced oil separator and cover in FIG. 12.

FIG. 12 depicts an embodiment similar to FIG. 8, except that the single-pieced oil separator and cover of FIG. 8 is replaced by a two-pieced oil separator 700 and cover 404 in FIG. 12. The cover is ultrasonically shear-joint-welded, as depicted by 802, to the bottom of the port to prevent the oil separator from falling out of the port.

Figure 13:
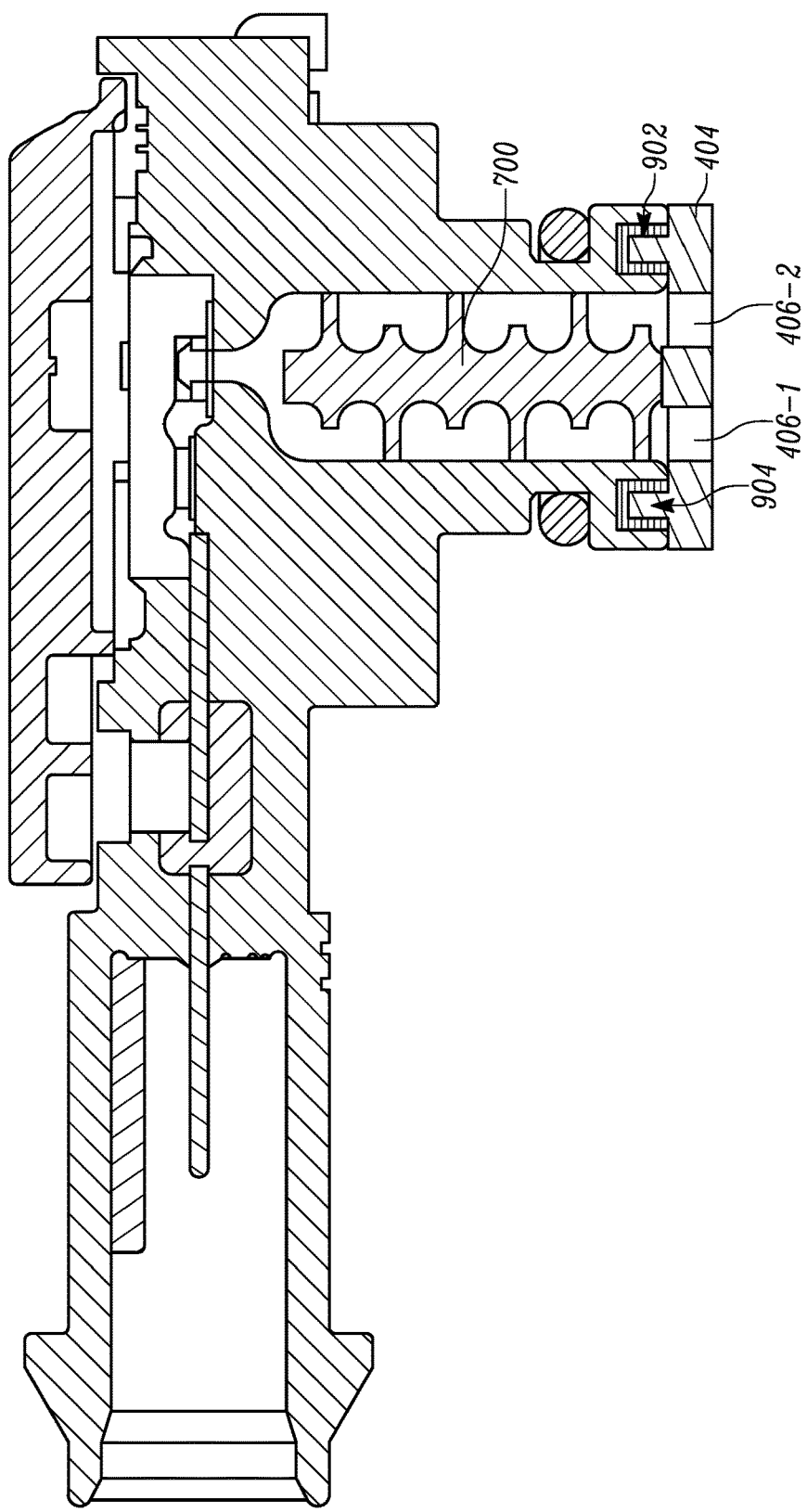
FIG. 13 depicts an embodiment similar to FIG. 9, except that the single-pieced oil separator and cover of FIG. 9 is replaced by a two-pieced oil separator and cover in FIG. 13.

FIG. 13 depicts an embodiment similar to FIG. 9, except that the single-pieced oil separator and cover of FIG. 9 is replaced by a two-pieced oil separator 700 and cover 404 in FIG. 13. The cover is glued, as depicted by adhesive-filled annular groove 902 and annular ridge 904, to the bottom of the port to prevent the oil separator from falling out of the port. The adhesive-filled annular groove and the annular ridge may extend 360 degrees around the opening of the port.

When installed in a pressure-sensor port, the oil separator elongates the air passage to allow more residues to be deposited upon the surfaces of the oil separator. This is mainly due to the increase in surface area and passage length which effectively reduces residue deposition on the backside surface of the pressure sensing element, which in turn, reduces voltage shift and improves sensing accuracy.

Figure 14:
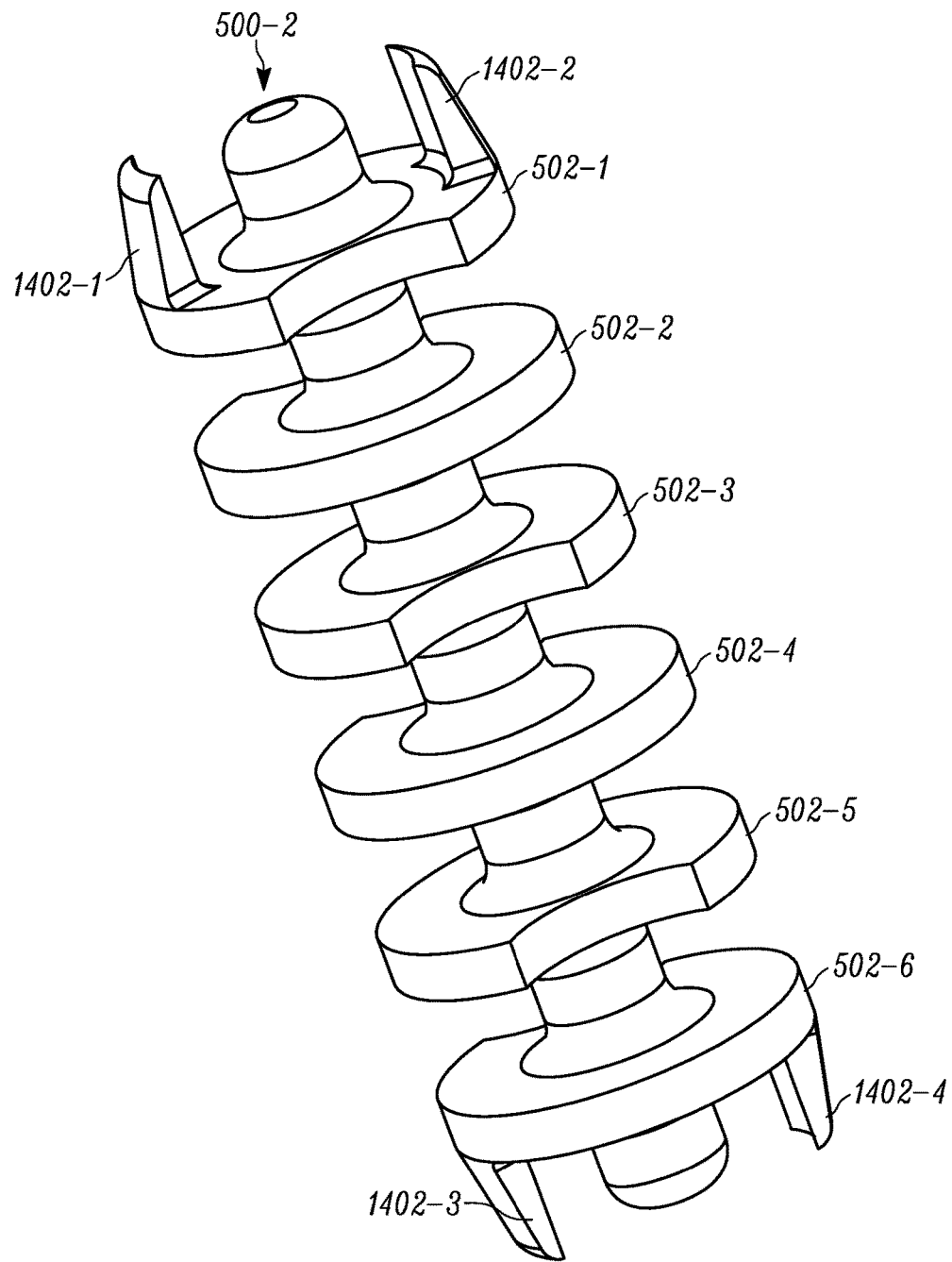
FIG. 14 depicts an oil separator with standoffs in accordance with embodiments of the invention.

FIG. 14 depicts an oil separator 500-2 in accordance with embodiments of the invention. The oil separator 500-2 includes discs 502-1 through 502-6 and standoffs 1402-1 through 1402-4. The oil separator 500-2 is configured to not move up or down while inserted in the port. Since the port is made of molded plastic, it has a natural draft angle to it to allow the mold pin to be pulled out easily. The radii of discs of the oil separator also vary to provide an interference with the port. Discs 502-1 and 502-6 have a same smallest diameter. Toward each other following the longitudinal axis. Discs 502-2 and 502-5 have a same larger diameter. The neighboring Discs 502-3 and 502-4 have a same largest diameter. Since the oil separator 500-2 without the cover is symmetric, there is no need to identify which side should be inserted first during the assembly process. The interference fit combined with the standoffs 1402-1 and 1402-2 or the interference fit combined with the standoffs 1402-3 and 1402-4 prevent the oil separator 500-2 from going too deep into the port thereby preventing the oil separator from damaging the port and the micro-electromechanical systems ("MEMS") components at the top of the port.

Figure 15:
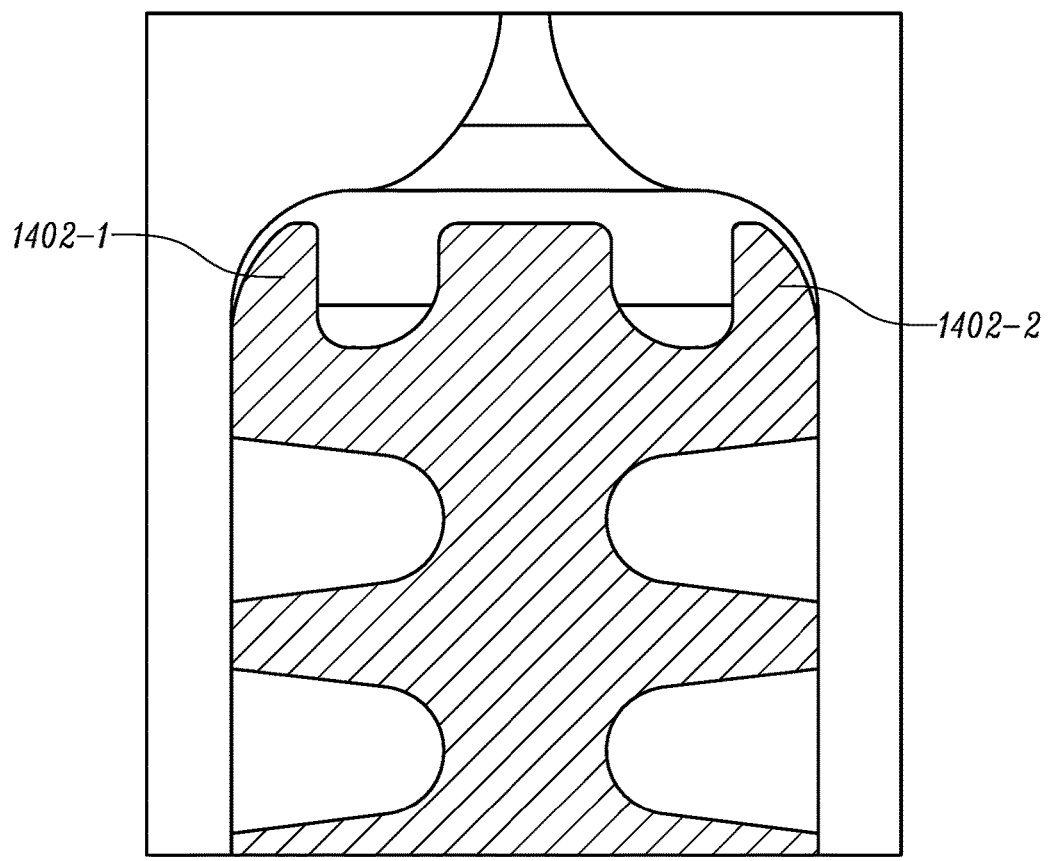
FIG. 15 shows the upper portion of an oil separator with standoffs inserted into the port of a pressure sensor.

FIG. 15 shows the upper portion of an oil separator 500-2 inserted into the port of a pressure sensor. If the oil separator 500-2 is inserted far enough to bottom out against an upper surface of the port, the standoffs 1402-1 and 1402-2 would prevent the oil separator 500-2 from hitting the topside of the port and damaging the MEMs components at the top of the port.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

The invention claimed is:

1. An apparatus comprising:
   a pressure sensor having a pressure sensing element in fluid communication with a port;
   an oil separator in the port, the oil separator configured to reduce an amount of oil-vapor residue that reaches the pressure sensing element by elongating a path of fluid from an opening of the port to the pressure sensing element and by creating additional surface area within the port upon which oil-vapor residue may be deposited, the oil separator including a plurality of discs, each disc having a cut-out portion, the cut-out portions of adjacent discs being rotated relative to one another about a longitudinal axis of the oil separator thereby creating a tortuous oil-vapor flow path involving oil vapor separating into separate flow paths below a disc, the separate flow paths flowing around opposite sides of a longitudinal axis of the oil separator toward a cutout portion of the disc, the separate flow paths then recombining into a single flow path that flows up through the cutout portion of the disc, the single flow path then separating again into separate flow paths that flow away from the cutout portion of the disc, above the disc, and around opposite sides of the longitudinal axis of the oil separator; and
   a cover having a plurality of holes and being configured to: prevent the oil separator from falling out of the port, and function as both a mechanical stopper and a rough filter.

2. The apparatus of claim 1, wherein the cut-out portions have a semi-circular shape.

3. The apparatus of claim 1, wherein the oil separator further comprises standoffs configured to prevent the oil separator from being inserted too far into the port.

4. The apparatus of claim 1, wherein the oil separator and the cover are formed as a single piece and the cover is ultrasonically welded to the bottom of the port.

5. The apparatus of claim 1, wherein the oil separator and the cover are formed as a single piece, and the cover is snap-fitted to the port to prevent the oil separator from falling out of the port.

6. The apparatus of claim 1, wherein the oil separator is welded to the cover, and the cover is welded to the bottom of the port.

7. The apparatus of claim 1, wherein the oil separator is welded to the cover, and the cover is glued into the bottom of the port.

8. The apparatus of claim 1, wherein the cover is ultrasonically welded to the bottom of the port.

9. The apparatus of claim 1, wherein the cover is snap-fitted to the bottom of the port.

10. The apparatus of claim 1, wherein the cover is welded into the bottom of the port.

11. The apparatus of claim 1, wherein the cover is glued into the bottom of the port.

12. A method comprising:
    in a pressure sensor having a pressure sensing element in fluid communication with a port, using an oil separator in the port to reduce an amount of oil-vapor residue that reaches the pressure sensing element by elongating a path of fluid from an opening of the port to the pressure sensing element and by creating additional surface area within the port upon which oil-vapor residue may be deposited, the oil separator including a plurality of discs, each disc having a cut-out portion, the cut-out portions of adjacent discs being rotated relative to one another about a longitudinal axis of the oil separator thereby creating a tortuous oil-vapor flow path involving oil vapor separating into separate flow paths below a disc, the separate flow paths flowing around opposite sides of a longitudinal axis of the oil separator toward a cutout portion of the disc, the separate flow paths then recombining into a single flow path that flows up through the cutout portion of the disc, the single flow path then separating again into separate flow paths that flow away from the cutout portion of the disc, above the disc, and around opposite sides of the longitudinal axis of the oil separator; and
    using a cover, having a plurality of holes, to prevent the oil separator from falling out of the port.

13. The method of claim 12, wherein the cut-out portions have a semi-circular shape.

14. The method of claim 12, wherein the oil separator and the cover are formed as a single piece and the cover is ultrasonically welded to the bottom of the port.

15. The method of claim 12, wherein the oil separator is welded to the cover, and the cover is attached to the port by snap-fitting, welding, or gluing.

16. The method of claim 12, wherein the cover is attached to the bottom of the port by ultrasonic welding, snap-fitting, welding, or gluing.

* * * * *